United States Patent
Hong et al.

(10) Patent No.: US 9,019,817 B2
(45) Date of Patent: Apr. 28, 2015

(54) AUTONOMIC NETWORK MANAGEMENT SYSTEM

(75) Inventors: Won Ki Hong, Gyeongbuk (KR); Sung Su Kim, Gyeonggi-do (KR); Young Joon Won, Seoul (KR)

(73) Assignee: Postech Academy-Industry Foundation, Gyeongbuk (KR)

( * ) Notice: Subject to any disclaimer, the term of this patent is extended or adjusted under 35 U.S.C. 154(b) by 315 days.

(21) Appl. No.: 13/574,255

(22) PCT Filed: Jan. 5, 2011

(86) PCT No.: PCT/KR2011/000042
§ 371 (c)(1),
(2), (4) Date: Jul. 20, 2012

(87) PCT Pub. No.: WO2011/090280
PCT Pub. Date: Jul. 28, 2011

(65) Prior Publication Data
US 2012/0281528 A1 Nov. 8, 2012

(30) Foreign Application Priority Data
Jan. 25, 2010 (KR) .................. 10-2010-0006325

(51) Int. Cl.
*H04L 12/26* (2006.01)
*H04L 29/14* (2006.01)
(Continued)

(52) U.S. Cl.
CPC ........ *H04L 12/2602* (2013.01); *H04L 41/0654* (2013.01); *H04L 41/0896* (2013.01); *H04L 43/00* (2013.01); *H04L 47/19* (2013.01);
(Continued)

(58) Field of Classification Search
CPC ..... H04L 12/2697; H04L 29/06; H04L 43/00; H04L 43/50; H04L 45/00; H04L 45/02; H04L 47/10; H04L 47/30; H04Q 11/0478
See application file for complete search history.

(56) References Cited

U.S. PATENT DOCUMENTS

2006/0146703 A1\* 7/2006 Cha et al. ............... 370/229
2009/0138618 A1\* 5/2009 Li et al. ................... 709/242

FOREIGN PATENT DOCUMENTS

| KR | 10 2000 0037863 A | 7/2000 |
|---|---|---|
| KR | 10 2003 0026679 A | 4/2003 |

(Continued)

OTHER PUBLICATIONS

International Search Report w/translation from PCT/KR2011/000042 dated Sep. 27, 2011 (4 pages).
(Continued)

*Primary Examiner* — John Pezzlo
*Assistant Examiner* — Matthew Campbell
(74) *Attorney, Agent, or Firm* — Osha Liang LLP

(57) ABSTRACT

The present invention relates to an autonomic network management system which includes: an active measurement unit that measures and analyzes a network state in an active measurement scheme; a passive measurement unit that measures and analyzes the network state in a passive measurement scheme; an autonomic management control unit that respectively receives the measured and analyzed results of the network from the active measurement unit and the passive measurement unit to determine the network state; and a transmission path control unit that receives a transmission path message from the autonomic management control unit to control a transmission path according to the transmission path message.

6 Claims, 7 Drawing Sheets

(51) Int. Cl.
*H04L 12/24* (2006.01)
*H04L 12/801* (2013.01)
*H04L 12/707* (2013.01)
*H04L 12/70* (2013.01)

(52) U.S. Cl.
CPC ............. *H04L45/22* (2013.01); *H04L 41/0213* (2013.01); *H04L 43/0852* (2013.01); *H04L 43/0882* (2013.01)

(56) References Cited

FOREIGN PATENT DOCUMENTS

| KR | 10 2004 0091989 A | 11/2004 |
| KR | 10 2006 0068445 A | 6/2006 |
| KR | 10 2007 0015808 A | 2/2007 |

OTHER PUBLICATIONS

Written Opinion from PCT/KR2011/000042 dated Sep. 27, 2011 (3 pages).
Korean Abstract Publication No. 1020060068445A dated Jun. 21, 2006 (2 pages).
Korean Abstract Publication No. 1020070015808A dated Feb. 6, 2007 (2 pages).
Korean Abstract Publication No. 1020040091989A dated Nov. 3, 2004 (2 pages).
Korean Abstract Publication No. 1020030026679A dated Apr. 3, 2003 (2 pages).
Korean Abstract Publication No. 1020000037863A dated Jul. 5, 2000 (2 pages).

* cited by examiner

AUTONOMIC NETWORK MANAGEMENT SYSTEM

TECHNICAL FIELD

Example embodiments of the present invention relate in general to network communication, and more specifically to a layer setting and traffic management method for network management on the Internet.

BACKGROUND ART

With the popularization of the Internet cable, the sharp increase in information transfer in a variety of forms using the Internet and new services based on the Internet, the volume of network traffic is drastically increasing, and the incremental trend is expected to continue. Accordingly, it is necessary to provide a method of increasing network management efficiency by monitoring traffic for efficient management of a network.

Network performance measurement methods may be generally classified into active measurement (AM) method and passive measurement (PM) methods according to their characteristics. In AM method, an experimental packet is given to a network, and characteristics of delay, loss, etc. shown after the packet passes through the network are mainly measured to analyze performance of the network. In PM methods, a packet that is currently flowing through a network is monitored without exerting influence on network flow, and the amount of traffic, traffic configuration or characteristics, etc. are mainly analyzed on the basis of the collected information.

For Internet protocol (IP) networks, AM uses national Internet measurement infrastructure (NIMI), Surveyor tools, simple network management protocol (SNMP), management information base (MIB), tcpdump working on UNIX, NetFlow of CISCO Systems, and so on.

In current networks, PM is frequently used to measure traffic of the networks. However, PM and AM have their own merits and demerits. Measurement of a network state using PM alone has its limitations, and the AM methods require high cost for system construction, analysis and consulting.

Also, packet transmission of current networks uses single-path-based routing. Although there are a plurality of paths, a current routing technique uses a single path for end-to-end packet transmission, and thus transmitted packets may be concentrated in a specific link and cause congestion. To solve such a problem, current networks depend on a transmission control protocol (TCP) congestion control mechanism. However, the TCP congestion control mechanism does not operate until congestion occurs in a specific packet transmission path, merely adjusts the amount of packet transmission of a host, and cannot use a plurality of paths.

In addition, since monitoring protocols such as SNMP and NetConf for monitoring network performance of the current Internet use the same transmission packet as data packets, monitoring information for monitoring a transmission state of data packets cannot be transmitted when a data packet transmission failure occurs. This means that, when a problem occurs in a network, it is difficult to accurately diagnose the problem and find a cause of the problem. Such a problem occurs because current network monitoring information uses the same protocol, such as TCP and user datagram protocol (UDP), on the data layer, and a router or a switch handles all monitoring information in the same manner as data. It is necessary to provide a traffic monitoring method and a transmission path control method for solving these problems.

DISCLOSURE

Technical Problem

The present invention is directed to providing a traffic measurement method that is intended for efficient management of a network and determined adaptively according to the network situation.

The present invention is also directed to providing a transmission path control method in a network that prevents congestion of the network.

Technical Solution

One aspect of the present invention provides an autonomic network management system, including: an active measurement agent configured to measure and analyze a state of a network according to an active measurement (AM) method; a passive measurement agent configured to measure and analyze the network state according to a passive measurement (PM) method; an autonomous management controller configured to receive measurement results and analysis results of the network state from the active measurement agent and the passive measurement agent and determine the network state; and a transmission path controller configured to receive a transmission path message from the autonomous management controller and adjust a transmission path according to the transmission path message.

The active measurement agent may be installed in a switch constituting the network, and may measure end-to-end bandwidth usage and an end-to-end delay.

The passive measurement agent may be installed in a switch constituting the network, and may perform full packet capture or capture some packets by sampling to perform the measurement.

The measurement results and analysis results of the network state may include bandwidth usage and flow information, and the flow information may include an address of hardware sending the flow information and an address of hardware receiving the flow information.

The autonomous management controller may calculate an alternative path for transmitting data when a current path is congested, compare bandwidth usage $T_{Alternative}$ of the alternative path with a set threshold value t2 when bandwidth usage $T_{current}$ of an interface of a switch exceeds a set threshold value t1, and transmit the transmission path message instructing data transmission through the alternative path to the transmission path controller when $T_{Alternative}$ is less than t2.

When a fault occurs in a specific link of the network or transmission of a packet is not smooth, the autonomous management controller may set the transmission path message for dividing the packet into a data packet and a management packet and transmitting the data packet and the management packet through different transmission paths respectively.

The different transmission paths may be different layers set to transmit the data packet and the management packet respectively, or different links physically separate from each other between respective switches of the network.

Advantageous Effects

Exemplary embodiments of the present invention enable efficient measurement of network traffic, prevention of congestion through prediction about congestion of a specific path, and transfer of management information through setting/control of a network transmission path even when a problem occurs in data transmission, thereby rapidly solving problems that have occurred or may occur in a network.

MODES OF THE INVENTION

Figure 1:
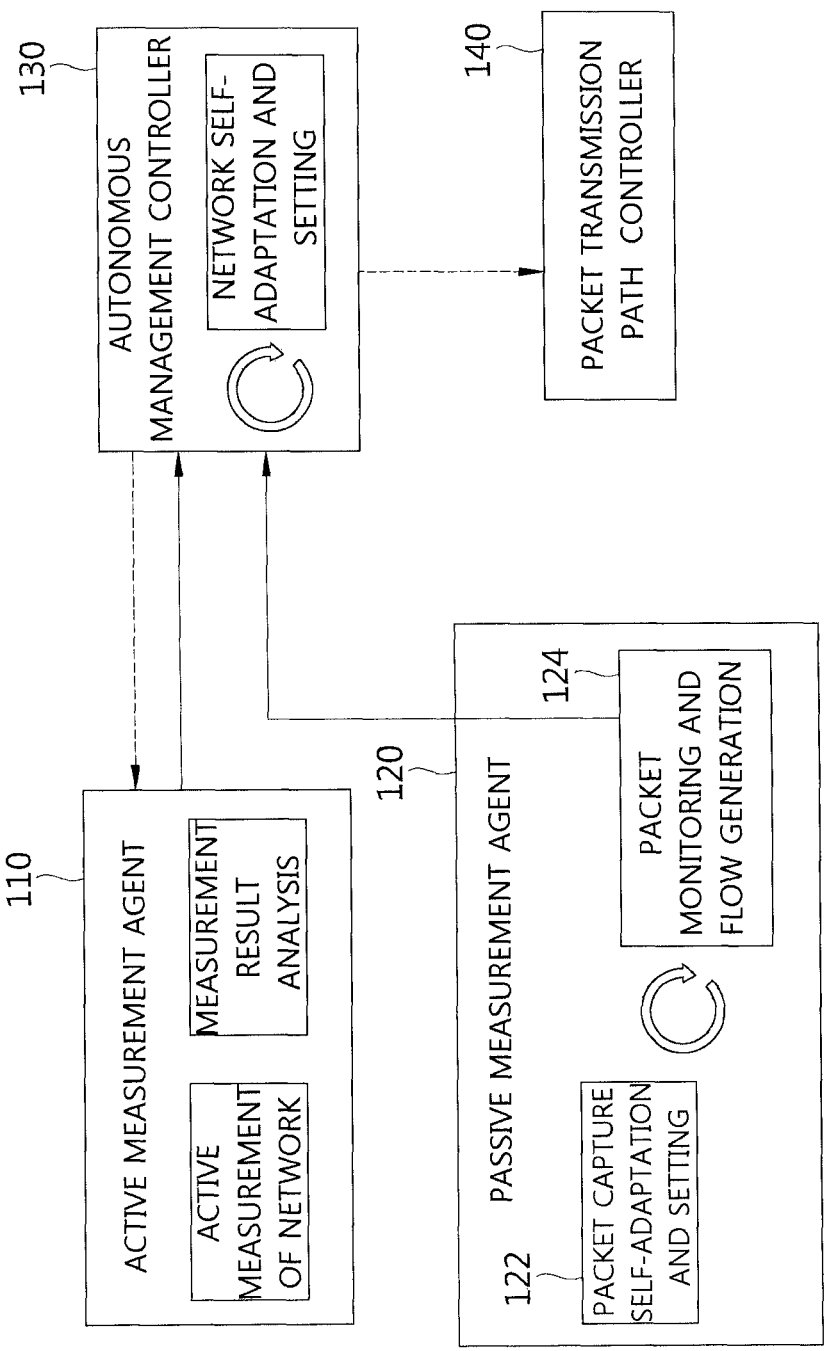
FIG. 1 is a block diagram of an autonomous Internet management system.

While the invention is susceptible to various modifications and alternative forms, specific embodiments thereof are shown by way of example in the drawings and will herein be described in detail. However, it should be understood that there is no intent to limit the invention to the particular forms disclosed, but on the contrary, the invention is to cover all modifications, equivalents, and alternatives falling within the spirit and scope of the invention.

FIG. 1 is a schematic block diagram of an autonomous Internet management system according to an exemplary embodiment of the present invention.

An autonomous management system 100 according to an exemplary embodiment of the present invention may include an active measurement agent 110, a passive measurement agent 120, an autonomous management controller 130, and a packet transmission path controller 140.

In the autonomous management system 100, network measurement is performed by the active measurement agent 110 and the passive measurement agent 120, and the active measurement agent 110 may transmit the result of measuring and analyzing a state of a network using an active measurement (AM) method to the autonomous management controller 130. In an example of an AM method used at this time, an Internet control message protocol (ICMP) echo request packet may be sent, and the state of the network may be measured using the result. In addition to this example, various AM methods may be used. A variety of known methods may be used as the AM method and passive measurement (PM) methods to be described below, and the technical spirit of the present invention is not limited to these methods.

The passive measurement agent 120 measures the state of the network using a PM method. In an example of the PM method, the passive measurement agent 120 checks central processing unit (CPU) usage of each switch, reduces the load of equipment imposed by passive measurement using a sampling method when the CPU usage is high, performs full packet capture 122 when the CPU usage is not high, generates a flow using the captured packets 124 and transfers the generated flow to the autonomous management controller 130.

The autonomous management controller 130 may analyze a current network state, and request measurement, which is additionally required for obtaining detailed network state information, from the active measurement agent 110 according to the analysis result. The autonomous management controller 130 determines whether the current state of the network is normal on the basis of information collected by the active measurement agent 110 and the passive measurement agent 120, and sends a transmission path modification message to the packet transmission path controller 140 when congestion is predicted or it is determined to solve a problem. The packet transmission path controller 140 modifies a transmission path of a packet by modifying flow information corresponding to a flow table of the corresponding switch. The autonomous management controller 130 of the system 100 is installed in a universal probe controller and manages the overall network, which will be described in detail with reference to FIG. 2.

Figure 2:
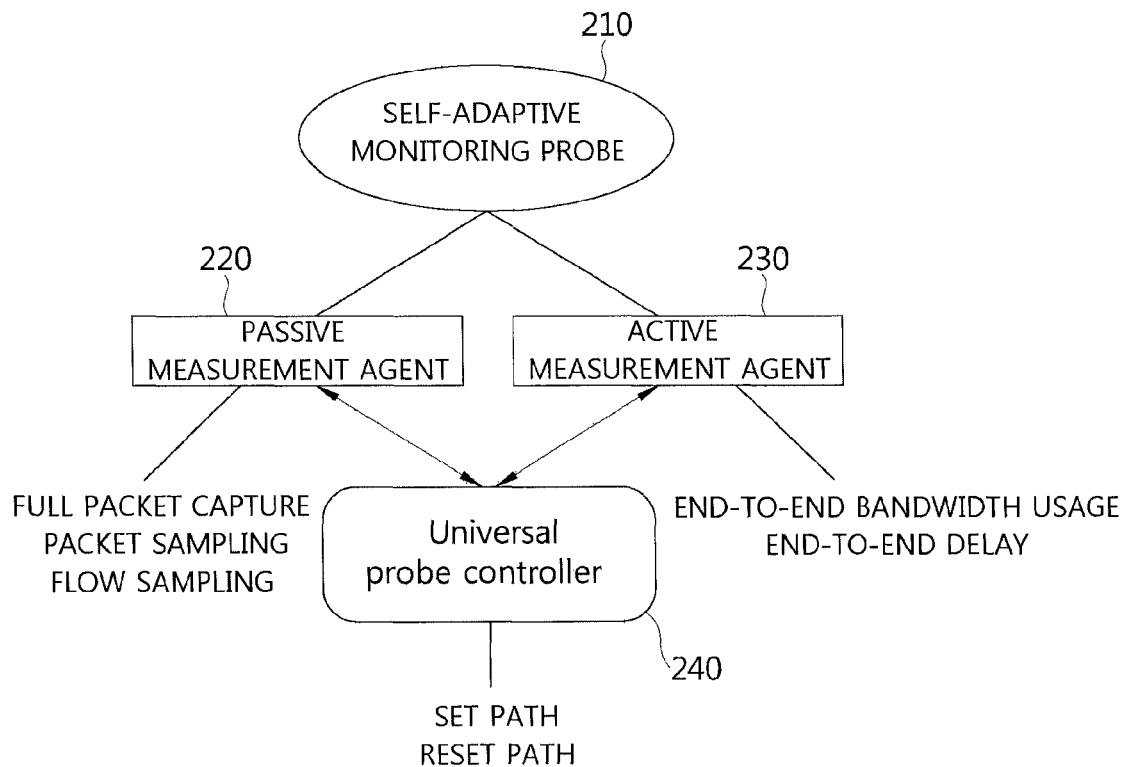
FIG. 2 illustrates a self-adaptive monitoring probe.

FIG. 2 is a conceptual diagram of an autonomous Internet management system according to an exemplary embodiment of the present invention.

In each of switches constituting a network, a self-adaptive monitoring probe 210 is installed, and a module of a passive measurement agent 220 and a module of an active measurement agent 230 are installed to measure various traffic and network states. The passive measurement agent 220 may perform full packet capture or capture a part of traffic using a sampling method. The active measurement agent 230 may measure a variety of indicators such as end-to-end bandwidth usage and end-to-end delay. The monitoring probe 210 is controlled by a central universal probe controller 240, and determines a type of measurement to be performed. The universal probe controller 240 serves to monitor nodes and links of the overall network according to an autonomous management mechanism provided in the present invention, and autonomously adjust a transmission path.

Figure 3:
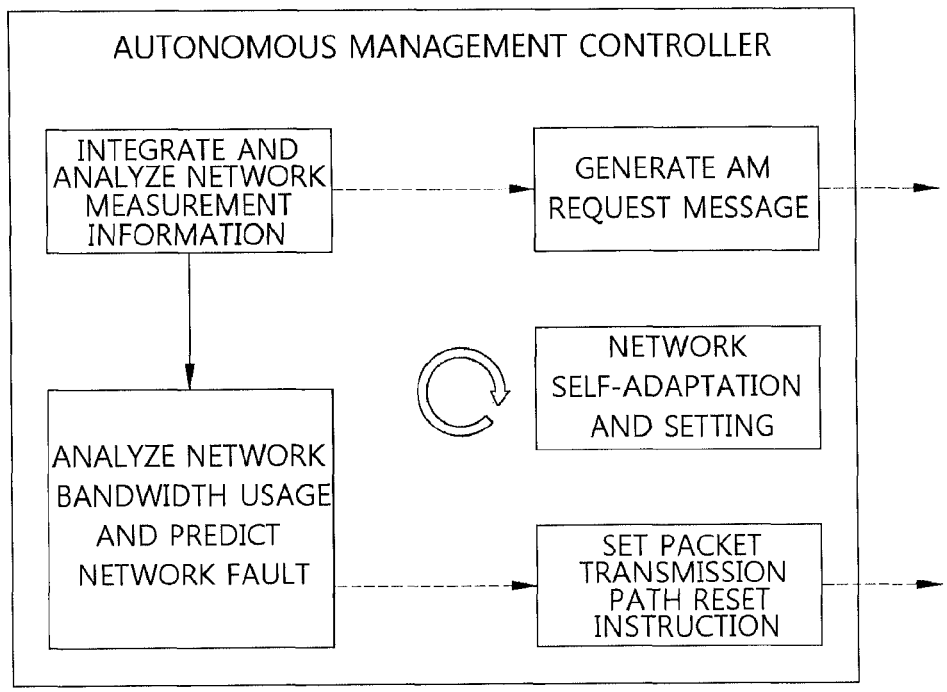
FIG. 3 is a block diagram of an autonomous management control mechanism.

FIG. 3 is a block diagram illustrating an autonomous management mechanism of an autonomous management controller according to an exemplary embodiment of the present invention. The autonomous management controller 130 integrates and analyzes network information measured by the active measurement agent 110 of FIG. 1 and the passive measurement agent 120 of FIG. 1, finds AM methods additionally required for accurate analysis of a network state, and transmits an AM request message to the active measurement agent 110. The autonomous management controller 130 analyzes network bandwidth usage on the integrated network measurement information, and when a network fault is predicted, resets a transmission path of a packet through a network self-adaptation and setting process and transmits a packet transmission path modification message.

Figure 4:
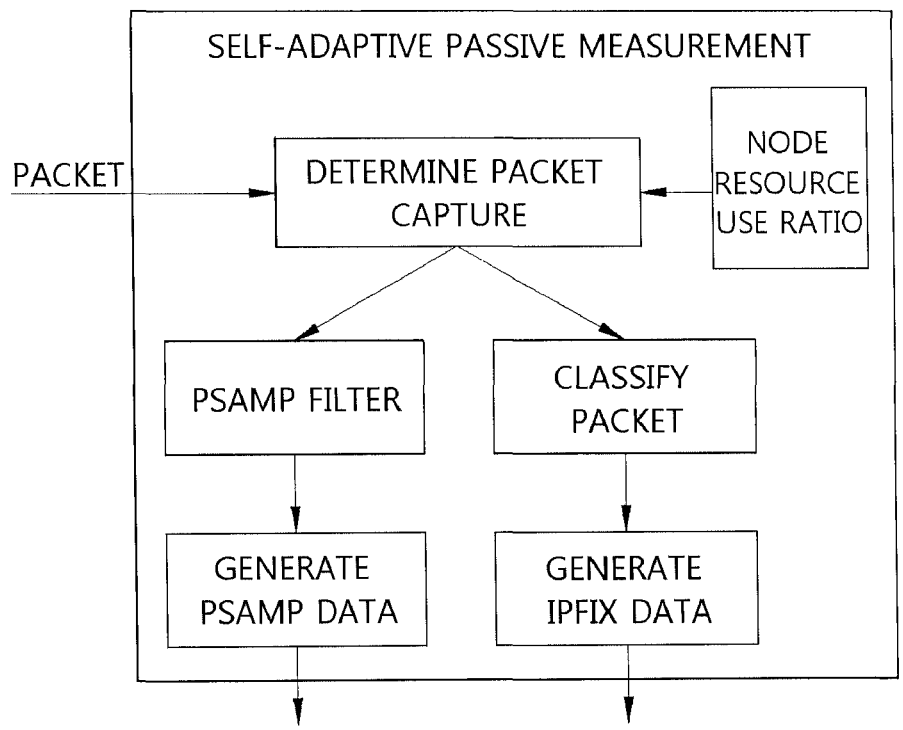
FIG. 4 is a block diagram of self-adaptive passive measurement (PM).

FIG. 4 is a block diagram illustrating a self-adaptive PM method according to an exemplary embodiment of the present invention. Respective passive measurement agents of switches constituting a system do not simply capture packets and generate a flow. Rather, the respective passive measurement agents refer to CPU usage ratios, etc. to generate a flow by selectively capturing packets using a sampling method when a heavy load is imposed on their switches, and by referring to all packets when a light load is imposed on their switches. The generated flow information is transmitted to a universal probe controller and used for autonomously managing a network.

Figure 5:
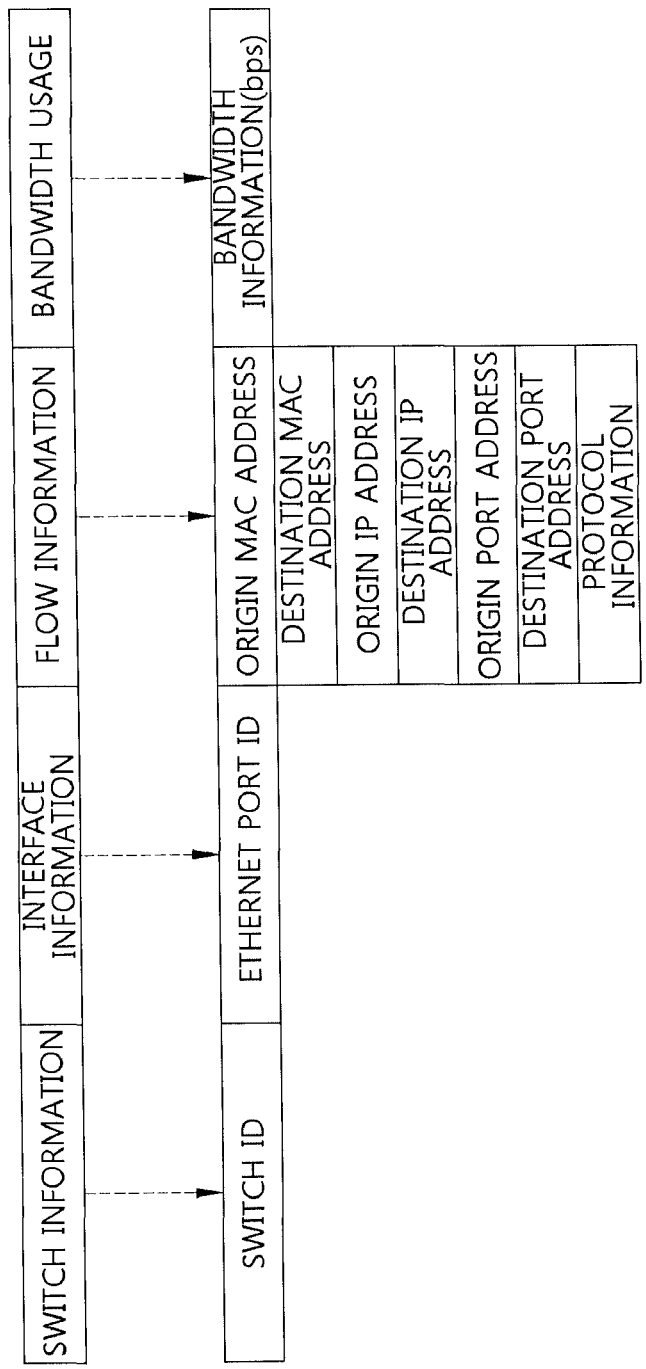
FIG. 5 is a block diagram of a bandwidth use information expression.

FIG. 5 is a block diagram illustrating a bandwidth usage expression based on information, such as a packet, a switch and usage, obtained from an active measurement agent and a passive measurement agent according to an exemplary embodiment of the present invention. In a bandwidth usage expression, a switch identification (ID), an interface number, flow information and bandwidth usage are recorded. The flow information (FIG. 5) has a concept expanded from a set of packets having five pieces of information including an origin Internet protocol (IP) address, a destination IP address, an origin port address, a destination port address and a protocol type according to the existing concept of unidirectional flow. Bidirectional flow used in the present invention additionally includes information of an origin hardware address and a destination hardware address, and denotes a set of packets that does not correspond to a single direction but corresponds to both of origin/destination directions.

Figure 6:
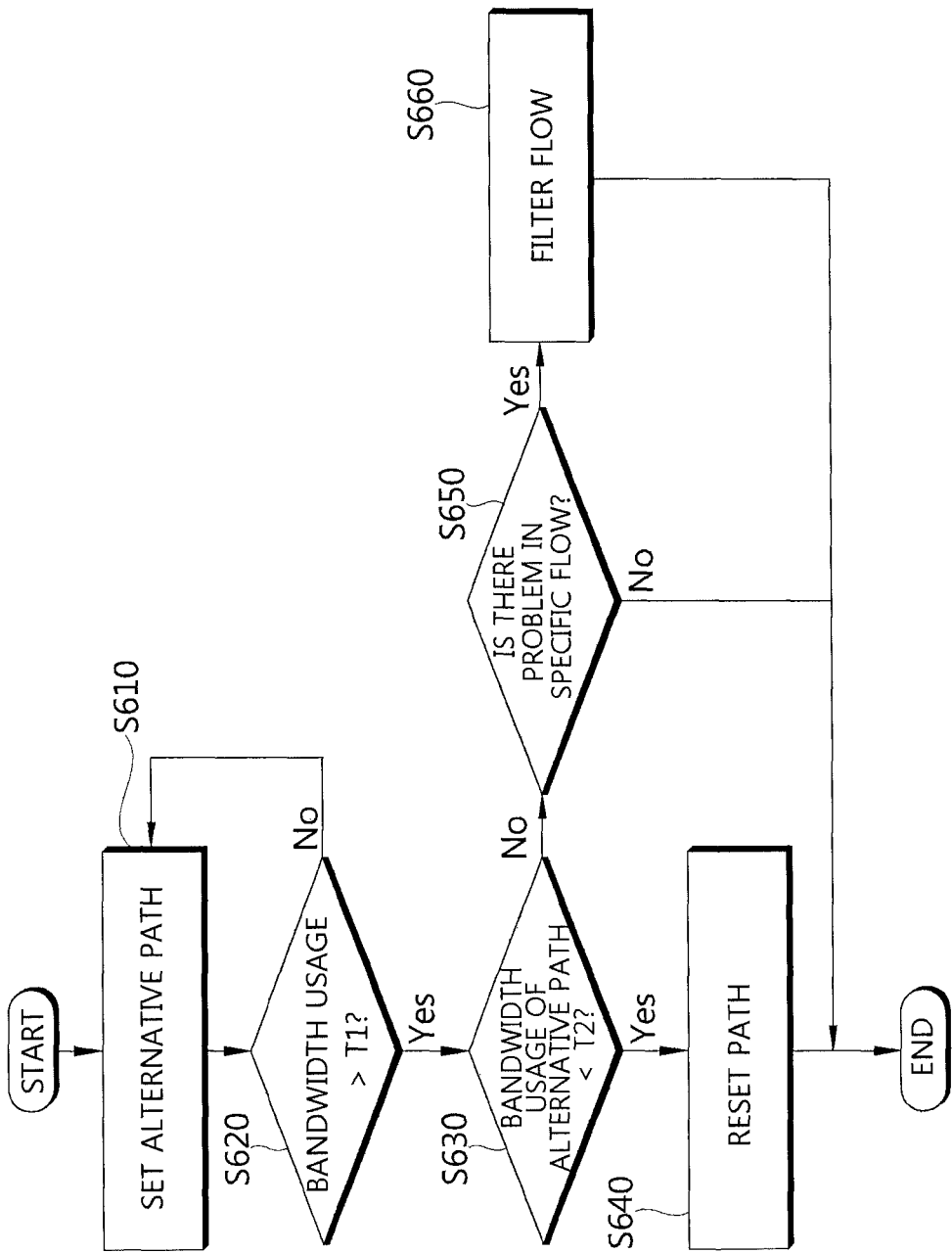
FIG. 6 is a flowchart illustrating a detailed transmission path resetting process.

FIG. 6 is a flowchart illustrating a congestion prediction and transmission path resetting algorithm according to an exemplary embodiment of the present invention. When a current path is congested, an alternative path for transmitting data is calculated (S610). This is a step of examining whether there is a path other than the current path among ports of the corresponding switch. Subsequently, bandwidth usage of a specific interface of the switch is compared with a set permissible value t1 (S620). When the comparison result is that the bandwidth usage is less than the set permissible value t1, transmission is performed through the current transmission path, and the alternative path calculation step is performed again. When the bandwidth usage is less than the set permissible value t1, the alternative path calculation step is performed again to detect an appropriate alternative path according to a change in network topology that may occur while transmission proceeds. By repeating such a step, it is possible to cope with a change in a network situation.

When the comparison result is that the bandwidth usage is greater than the set permissible value t1, it is predicted that a fault will occur in the path due to congestion, and bandwidth usage of the alternative path is checked (S630). The bandwidth usage of the alternative path is compared with a set permissible value t2, and when the bandwidth usage of the alternative path is less than the set permissible value t2, a flow is selected and detoured to the alternative path (S640). When the bandwidth usage of the alternative path is also greater than the set permissible value t2, it is checked whether or not there is a problem in a specific flow according to a policy of an administrator (S650). When there is a problem, the specific flow is filtered (S660), and when there is no problem, a current state is maintained. The algorithm of FIG. 6 is periodically performed in interfaces of the corresponding switch. Thus, when the method of selecting a flow and resetting a path is repeatedly applied, bandwidth usage of the interfaces is kept at t1 or less except for the case of heavy traffic transmission in which all the interfaces are used to their limits.

Figure 7:
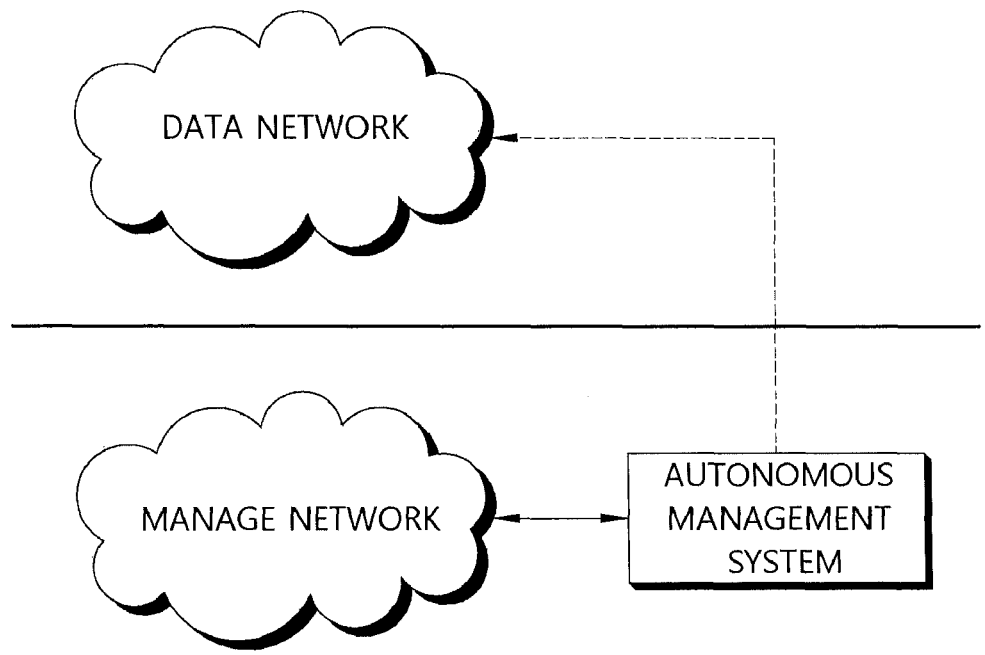
FIG. 7 shows a configuration divided into a data layer and a management layer.

FIG. 7 is a diagram schematically illustrating a configuration divided into a data layer and a management layer according to an exemplary embodiment of the present invention. The configuration divided into a data layer and a management layer according to the present invention is in accordance with a method of transmitting a data packet and a management packet through different transmission paths or a method of configuring a physically separated link between respective switches. An autonomous management system measures a state of a network and detects a problem through monitoring information, which is transmitted using the data layer, and modifies a data transmission method by changing a setting of the data layer when a change is required in the setting of the data layer. The respective methods will be described in detail below with reference to FIG. 8 and FIG. 9.

Figure 8:
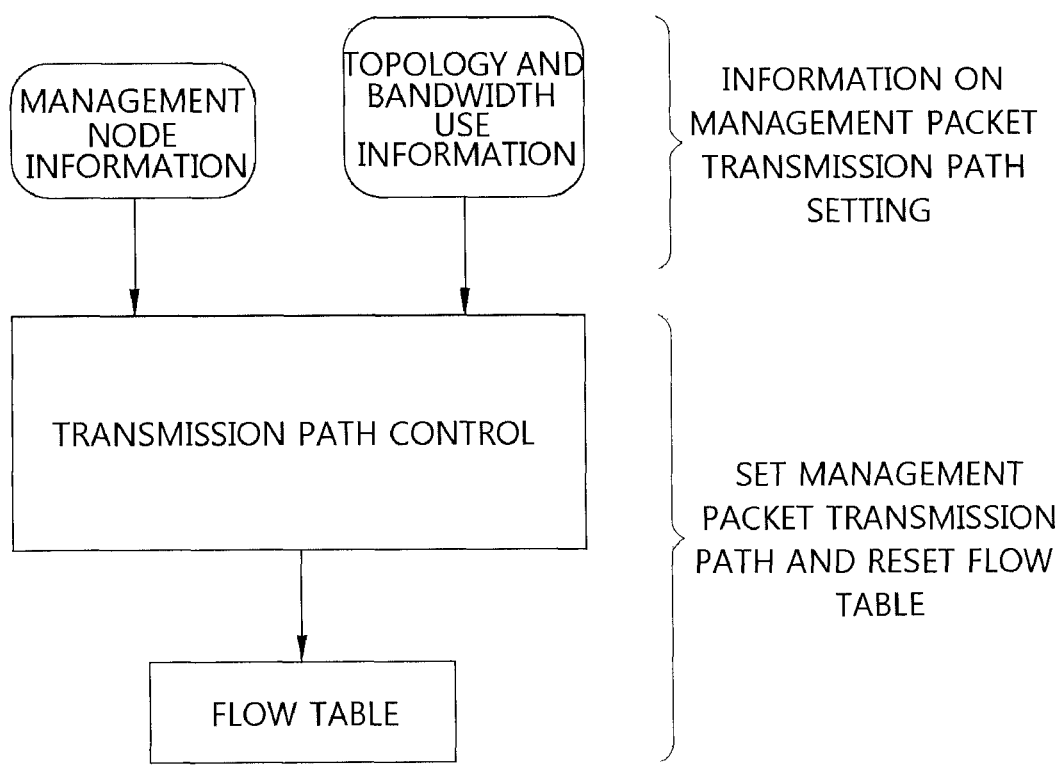
FIG. 8 illustrates method 1 of separately configuring transmission paths for a data packet and a management packet.

FIG. 8 is a diagram illustrating an example of separately configuring transmission paths for a data packet and a management packet according to an exemplary embodiment of the present invention. When a fault occurs in a link or packet transmission is not smooth, neither a data packet nor a management packet can be transmitted. Thus, IP and media access control (MAC) address information and topology information on a management node is input, and a transmission path controller calculates a path for transmitting the management packet, which is different from a transmission path of the data packet, in consideration of the bandwidth usage of each link and resets flow tables of switches of the paths so that a flow having IP and MAC addresses corresponding to each switch can be transmitted through the path different than the data packet.

A setting whereby a management packet transmission path is separated from a data packet transmission packet enables configuration of a local network of FIG. 7 in which data and management packets use different transmission paths. Such a network configuration enables transmission of a management packet even when a problem occurs in transmission of a data packet.

Figure 9:
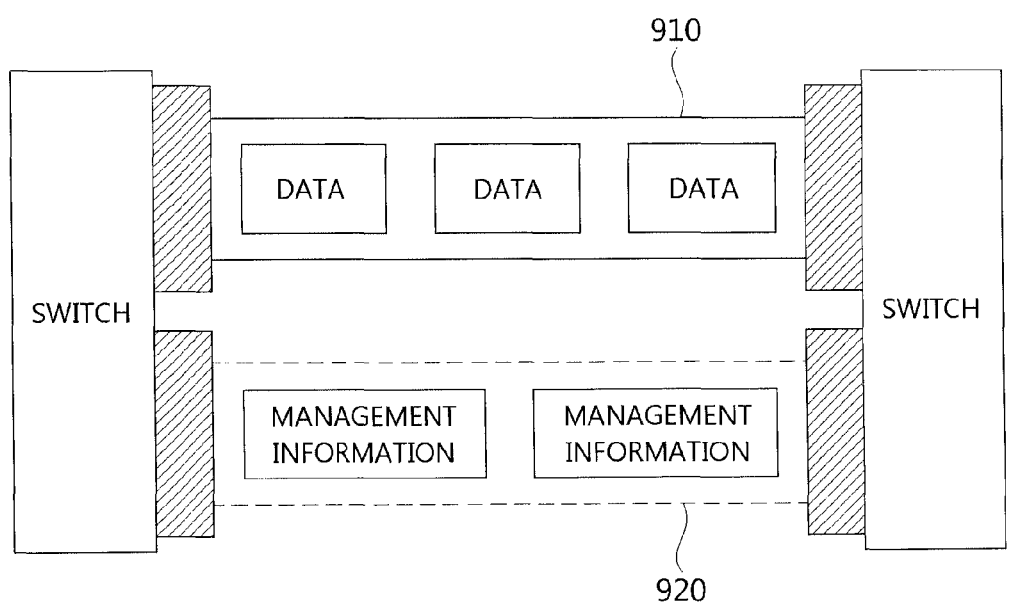
FIG. 9 illustrates method 2 of separately configuring transmission paths for a data packet and a management packet.

FIG. 9 shows a configuration of two links, which are physically separate from each other to separate a data layer and a management layer, between respective switches according to an exemplary embodiment of the present invention. Physical separation between a link 910 for transmission of only data packets and a link 920 for transmission of management packets enables management packets to be smoothly transmitted through the separate link 920 even when a fault occurs in the data link 910 or smooth data transmission is impossible due to huge traffic. Accordingly, when a problem occurs in a network, due to a management packet that is smoothly received, it is possible to figure out a cause and solve the problem faster than in a conventional network.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An autonomic network management system, comprising:
   an active measurement agent configured to measure and analyze a state of a network according to an active measurement (AM) method;
   a passive measurement agent configured to measure and analyze the network state according to a passive measurement (PM) method;
   an autonomous management controller configured to receive measurement results and analysis results of the network state from the active measurement agent and the passive measurement agent and determine the network state; and
   a transmission path controller configured to receive a transmission path message from the autonomous management controller and adjust a transmission path according to the transmission path message,
   wherein the autonomous management controller calculates an alternative path for transmitting data when a current path is congested, compares bandwidth usage $T_{Alternative}$ of the alternative path with a set threshold value t2 when bandwidth usage $T_{current}$ of an interface of a switch exceeds a set threshold value t1, and transmits the transmission path message instructing data transmission through the alternative path to the transmission path controller when $T_{Alternative}$ is less than t2.

2. The autonomic network management system of claim 1, wherein the active measurement agent is installed in a switch constituting the network, and measures end-to-end bandwidth usage and an end-to-end delay.

3. The autonomic network management system of claim 1, wherein the passive measurement agent is installed in a switch constituting the network, and performs full packet capture or captures some packets by sampling to perform the measurement.

4. The autonomic network management system of claim 1, wherein the measurement results of the network state include bandwidth usage and flow information, and
the flow information includes an address of hardware sending the flow information and an address of hardware receiving the flow information.

5. An autonomic network management system, comprising:
an active measurement agent configured to measure and analyze a state of a network according to an active measurement (AM) method;
a passive measurement agent configured to measure and analyze the network state according to a passive measurement (PM) method;
an autonomous management controller configured to receive measurement results and analysis results of the network state from the active measurement agent and the passive measurement agent and determine the network state; and
a transmission path controller configured to receive a transmission path message from the autonomous management controller and adjust a transmission path according to the transmission path message,
wherein, when a fault occurs in a specific link of the network or transmission of a packet is not smooth, the autonomous management controller sets the transmission path message for dividing the packet into a data packet and a management packet and transmitting the data packet and the management packet through different transmission paths respectively.

6. The autonomic network management system of claim 5, wherein the different transmission paths are different layers set to transmit the data packet and the management packet respectively, or different links physically separate from each other between respective switches of the network.

* * * * *